W. H. DUNKERLEY.
TIRE AND METHOD OF MAKING THE SAME.
APPLICATION FILED APR. 8, 1916.
1,213,600. Patented Jan. 23, 1917.
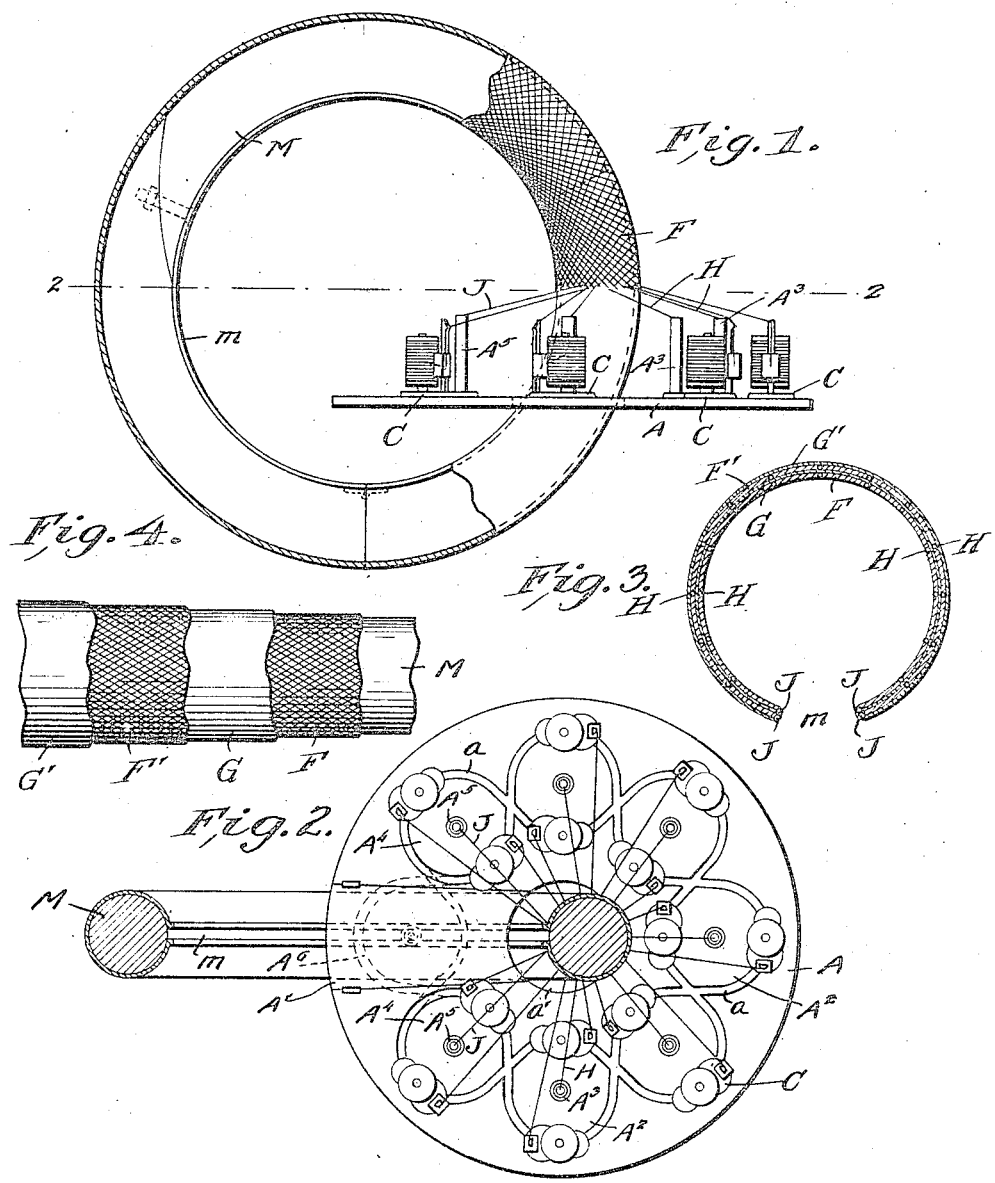

UNITED STATES PATENT OFFICE.

WILLIAM H. DUNKERLEY, OF PATERSON, NEW JERSEY.

TIRE AND METHOD OF MAKING THE SAME.

1,213,600.　　　　Specification of Letters Patent.　　Patented Jan. 23, 1917.

Application filed April 8, 1916. Serial No. 89,766.

*To all whom it may concern:*

Be it known that I, WILLIAM H. DUNKERLEY, a citizen of the United States, residing at Paterson, in the county of Passaic and State of New Jersey, have invented a certain new and useful Improvement in Tires and Methods of Making the Same, of which the following is a specification.

The invention relates to annular structures of fabric and rubber, of which bicycle and automobile tires are examples, and the method of making the same. Such structures are commonly made by winding strips of woven fabric in layers upon a suitable form, alternated with layers of soft rubber, and the whole vulcanized. In a tire thus built up it is evident the threads of the fabric must lie in the finished article under unequal strains even though the strips of fabric be cut on the bias. This inequality of strains is mainly due to the difference between the inner and the tread diameters of the tire and cannot be avoided in this method of construction.

The object of this invention is to provide an annular structure of this type, in which the tension on each thread throughout each layer is uniform, and the annulus has sufficient inherent stability to enable it to maintain its form under all conditions, and also to provide each layer with reinforcing strands extending circumferentially, and to incorporate cords or bands of rubber or other material along the inner face of the annulus at the margins of an inner circumferential opening, in position to be vulcanized with the annulus and serve as the usual clencher flanges or ribs.

The invention consists in the method and certain novel features of construction and arrangement by which the above objects are attained, to be hereinafter described and pointed out in the claims.

The accompanying drawings form a part of this specification.

Figure 1 is an elevation, partly in vertical section, showing the improved tire in process of manufacture on a braiding machine, with so much of the latter as is necessary to show its operation. Fig. 2 is a corresponding plan view, partly in horizontal section, the plane of section being indicated by the line 2—2 in Fig. 1. Fig. 3 is a cross-section of a tire of the clencher type on a larger scale. Fig. 4 is a plan view showing the core and several layers and coatings thereon.

Similar letters of reference indicate like parts in all the figures.

The method herein described may be carried out in a variety of ways, but in the present drawing I have chosen to illustrate what I have found to be an efficient form of device for accomplishing my purpose.

As illustrated in the drawings the tire is formed on a collapsible core M, by braiding the fabric layers directly thereon.

A is the table of the machine having serpentine raceways $a$ in which the dolls or spool-carriers C C are traversed by the usual mechanism, and a central opening $a^1$ in which the annular core M is received and slowly rotated as the braided layer is applied.

$A^1$ is a removable portion or sector of the table which permits the introduction of the core and its removal with the annulus. The core being in position the braiding machine is started and lays a braided covering or layer F of threads from the spool-carriers C C upon the core, with each thread smoothly delivered under the same tension, of uniform thickness and without wrinkles. Upon this layer a coating G of soft rubber is applied, by means not shown, and a second layer $F^1$ of threads is braided upon such coating, which layer in turn receives its coating $G^1$ of rubber, and so on until the required thickness is attained. The core and its annulus is then withdrawn from the machine through the opening provided by the withdrawal of the sector $A^1$, the core M removed and the tire vulcanized and otherwise treated as usual.

In the machine as shown by the full lines in Fig. 2, the raceway $a$ does not completely encircle the core but terminates at each side in the manner common in flat braiding, and the dolls C C return in the reverse direction, thus providing a continuous narrow opening $m$ on the inner face of the tire, through which the core M may be removed in the collapsed condition.

H H are strong reinforced strands of thread, wire, or other material, introduced through hollow standards $A^3$ $A^3$ set in the islands $A^2$ $A^2$ of the raceway, and extending circumferentially of the tire to aid in strengthening the tread portion and resisting radial expansive strains. These strands H H lie in practically parallel lines around the annulus and are held in place by the braiding threads with which they are incorporated in the layers F, $F^1$.

$A^5$ $A^5$ are similar hollow standards in the islands $A^4$ $A^4$ at each end of the course followed by the dolls C C. Each delivers a heavy cord J of soft rubber or other material which is braided in at the adjacent margin of the opening m and serves to produce a thickened selvage along such margin, which in vulcanizing is shaped to form a clencher flange or rib.

The threads forming the layers are applied smoothly and evenly and under practically uniform tension, a condition best adapted to insure the desired strength, resistance to wear, and resiliency in the finished tire.

I claim:—

1. The herein described method of forming a circumferentially divided annulus in one complete continuous operation, which consists in braiding a plurality of threads in a plurality of layers continuous of each other and maintaining all of the threads under permanent uniform tension one upon the other and simultaneously forming selvages continuous of each other along the edges.

2. The herein described method of forming a circumferentially divided annulus in one complete continuous operation, which consists in braiding a plurality of threads in a plurality of layers continuous of each other one upon the other and simultaneously forming reinforced selvages continuous of each other throughout the various layers.

3. The herein described method of making a divided annulus in one complete continuous operation, which consists in braiding a plurality of threads continuous of each other and alternately forming layers of braided threads and rubber each continuous throughout the annulus and simultaneously embodying in each braided layer a reinforcement at its opposite edges continuous of each other and throughout the annulus and placing all of the threads permanently under uniform tension.

4. A tire or analogous annulus composed of layers of thread all continuous of each other, each layer braided continuously to form an annular fabric having an opening along its inner face, layers of rubber continuous of each other and alternating with the layers of thread and circumferentially extended cords incorporated in said fabric at the margins of said opening to form selvage edges therefor, said cords being continuous of each other and of each thread layer and all of the threads being permanently under uniform tension.

5. A tire or analogous annulus composed of layers of thread all continuous of each other, each layer braided continuously to form an annular fabric having an opening along its inner face, layers of rubber continuous of each other and alternating with the layers of thread and circumferentially extended cords incorporated in said fabric at the margins of said opening to form selvage edges therefor, said cords being continuous of each other and of each thread layer and all of the threads being permanently under uniform tension, and reinforcing strands incorporated with the thread layers and made continuous of each other and with the threads throughout the tire.

6. A permanently-formed braided annulus with all of its threads under uniform tension and comprising a multiplicity of layers of alternating braided thread and rubber, the layers of threads being continuous of each other, said annulus having a circumferential opening, and reinforcements continuous of each other incorporated in said braided layers at opposite edges of said opening.

7. A tire or analogous annulus composed of layers of thread, each layer braided continuously in the form of an annular fabric with a circumferential opening with the threads under uniform tension and alternating with layers of rubber, all of the layers of thread being continuous of each other, and a reinforcing cord for each layer extending circumferentially, the reinforcing cords being continuous of each other and each thread layer.

8. A tire or analogous annulus composed of layers of thread, each layer braided continuously in the form of an annular fabric with the threads under uniform tension and alternating with layers of rubber, all of the layers of thread being continuous of each other, a reinforcing strand for each layer extending circumferentially, and cords of rubber incorporated with each braided layer along the inner face of the annulus at the margins of an inner circumferential opening therein, said cords being continuous of each other and of each thread layer throughout the annulus.

9. A tire or analogous annulus composed of layers of thread, each layer braided continuously in the form of an annular fabric with the threads under uniform tension and alternating with layers of rubber, all of the layers of thread being continuous of each other, a reinforcing strand for each layer extending circumferentially, and cords of rubber incorporated therewith along the inner face of the annulus at the margins of an inner circumferential opening therein, said rubber cords being continuous of each other and of the braided layers and vulcanized with the annulus and serving as clencher ribs.

In testimony that I claim the invention above set forth I affix my signature.

WILLIAM H. DUNKERLEY.